United States Patent
Signorelli et al.

(10) Patent No.: US 7,663,372 B2
(45) Date of Patent: Feb. 16, 2010

(54) RESISTIVITY TOOLS WITH COLLOCATED ANTENNAS

(75) Inventors: Jack Signorelli, Cypress, TX (US); Tsili Wang, Katy, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 11/858,717

(22) Filed: Sep. 20, 2007

(65) Prior Publication Data

US 2008/0074336 A1 Mar. 27, 2008

Related U.S. Application Data

(60) Provisional application No. 60/846,949, filed on Sep. 25, 2006.

(51) Int. Cl.
*G01V 3/10* (2006.01)
(52) U.S. Cl. .................................. 324/343; 324/339
(58) Field of Classification Search .......... 324/338–343
See application file for complete search history.

(56) References Cited

U.S. PATENT DOCUMENTS

| | | | |
|---|---|---|---|
| 3,377,549 A * | 4/1968 | Arnerich et al. ............. | 324/342 |
| 4,968,940 A | 11/1990 | Clark et al. | |
| 5,089,779 A * | 2/1992 | Rorden ........................ | 324/339 |
| 5,280,243 A | 1/1994 | Miller | |
| 5,530,358 A | 6/1996 | Wisler et al. | |
| 5,892,361 A | 4/1999 | Meyer, Jr. et al. | |
| 6,163,155 A | 12/2000 | Bittar | |
| 6,181,138 B1 * | 1/2001 | Hagiwara et al. ........... | 324/338 |
| 6,218,842 B1 | 4/2001 | Bittar et al. | |
| 6,366,089 B1 | 4/2002 | Poitzsch et al. | |
| 6,646,441 B2 | 11/2003 | Thompson et al. | |
| 6,703,837 B1 | 3/2004 | Wisler et al. | |
| 6,788,066 B2 * | 9/2004 | Wisler et al. ................. | 324/376 |
| 6,838,876 B2 | 1/2005 | Kruspe et al. | |
| 7,057,392 B2 | 6/2006 | Wang et al. | |
| 7,239,145 B2 | 7/2007 | Homan et al. | |
| 2003/0071626 A1 | 4/2003 | Omeragic et al. | |
| 2003/0085707 A1 | 5/2003 | Minerbo et al. | |
| 2004/0113626 A1 * | 6/2004 | Wang et al. .................. | 324/339 |
| 2005/0141373 A1 | 6/2005 | Kaneshige et al. | |
| 2006/0043973 A1 * | 3/2006 | Chen et al. ................... | 324/339 |
| 2006/0186888 A1 * | 8/2006 | Wang et al. .................. | 324/338 |
| 2007/0035305 A1 | 2/2007 | Itskovich et al. | |

FOREIGN PATENT DOCUMENTS

WO 0121927 A2 3/2001

* cited by examiner

*Primary Examiner*—Jay M Patidar
(74) *Attorney, Agent, or Firm*—Madan & Sriram, P.C.

(57) ABSTRACT

A resistivity tool for use in a wellbore is provided. The resistivity tool, in one embodiment, may include a longitudinal tool member, a first set of slots at a selected location in the longitudinal tool member and a conductor associated with the first set of slots to form a first antenna having a first orientation, and a second set of slots substantially at the selected location of the longitudinal tool member and a second conductor associated with the second set of slots to form a second antenna having a second orientation, thereby forming collocated antennas having different orientations.

21 Claims, 8 Drawing Sheets

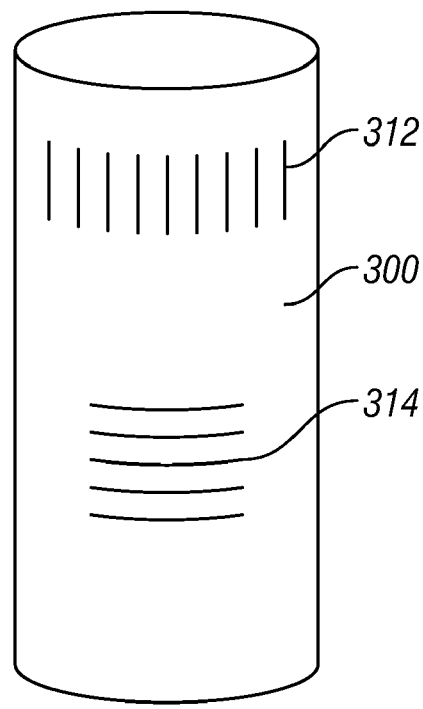
FIG. 3
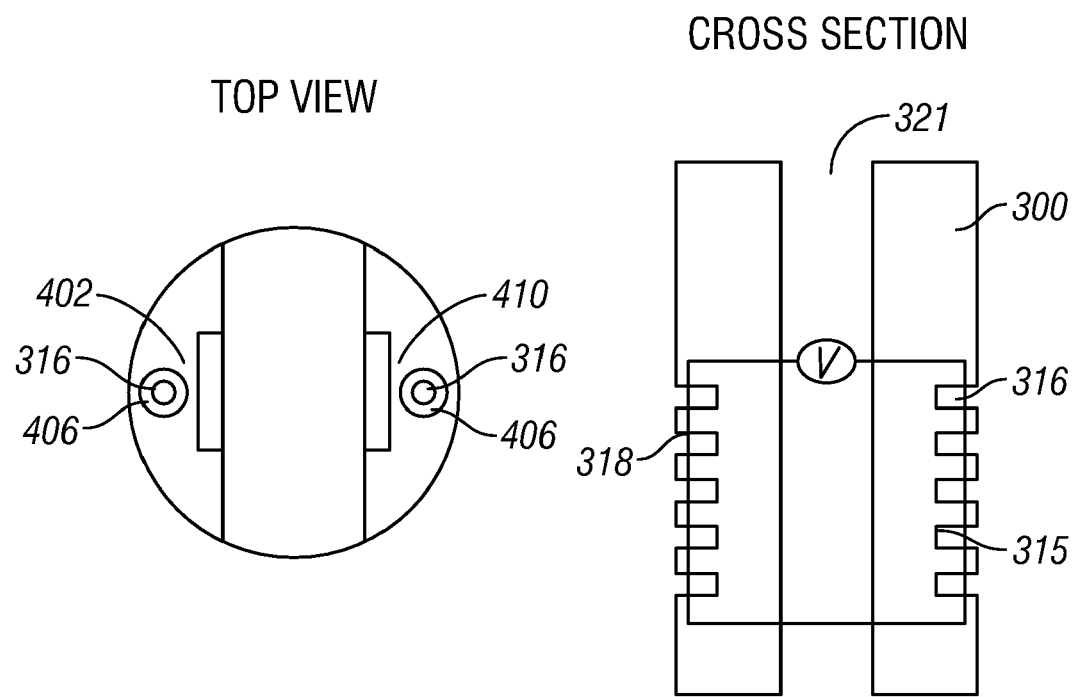
FIG. 4A  FIG. 4B

LONGITUDINAL VIEW

CROSS-SECTIONAL VIEW
A-A

LONGITUDINAL VIEW

CROSS-SECTIONAL VIEW
A-A

LONGITUDINAL VIEW

LONGITUDINAL VIEW

CROSS-SECTIONAL VIEW

LONGITUDINAL VIEW

CROSS-SECTIONAL VIEW

LONGITUDINAL VIEW

RESISTIVITY TOOLS WITH COLLOCATED ANTENNAS

CROSS-REFERENCE TO RELATED APPLICATIONS

This application takes priority from U.S. Provisional Patent Application No. 60/846,949, filed on Sep. 25, 2006, which is fully incorporated herein by reference.

BACKGROUND OF THE DISCLOSURE

1. Field of the Disclosure

This disclosure herein relates to the field of electrical resistivity well logging tools and methods.

2. Description of the Related Art

Wellbores or boreholes for producing hydrocarbons (such as oil and gas) are drilled using a drill string that includes a tubing made up of jointed tubulars or a continuous coiled tubing with a drilling assembly, also referred to as the bottom hole assembly (BHA), attached to its bottom end. The BHA includes a number of sensors, formation evaluation tools, and directional drilling tools. A drill bit attached to the BHA is rotated with a drilling motor in the BHA and/or by rotating the drill string to drill the wellbore. One of the formation evaluation tools commonly used is an electromagnetic wave propagation logging tool for the determination of electrical properties of formations surrounding a borehole. Such tools are generally referred to in the oil and gas industry as the resistivity tools. These logging tools make measurements of apparent resistivity (or conductivity) of the formation that, when interpreted, provide information about the petrophysical properties of the formation surrounding the borehole and fluids contained therein. Resistivity logging tools also are commonly used for logging wells after the wells have been drilled. Depending upon the application, these tools are referred to as the wireline resistivity tools, logging-while-drilling (LWD) or measurement-while-drilling (MWD) resistivity tools. These tools also are often referred to as induction logging tools. For the purpose of this disclosure, the term resistivity tool or induction logging tool is meant to include all such versions.

A typical resistivity tool includes a number of receiver coils or antennas placed at various axial distances from one or more transmitter coils or antennas. Alternating current is passed through the transmitter coil, which induces alternating electromagnetic fields in the earth formations. Voltages are induced in the receiver coils as a result of electromagnetic induction phenomena related to the alternating electromagnetic fields induced in the formation surrounding the wellbore.

Resistivity tools typically employ co-axial antennas. These antennas do not provide information relating to anisotropy at low relative dipping angles and direction of an approaching bed relative to the drill bit. To obtain such information, axially-spaced multi-component antennas are used, which spacing results in extremely long tools. Also, measurements made by each such antenna requires depth interpolation for its location for processing and interpretation of the measured signal.

The disclosure herein provides improved apparatus and methods that address some of the above-noted issues relating to resistivity tools.

SUMMARY

The present disclosure provides a resistivity tool for use in wellbore operations that, in one aspect may include: a first antenna having a first orientation and a second antenna having a second orientation, wherein the first and the second antennas are collocated (placed at the same or substantially the same location) of a tool member. The location at which the antennas are located may be the same axial and radial (azimuthal) location of the tool member. In another aspect, the tool may include a third antenna having a third orientation. The first, second and third antennas may be mutually orthogonal. Two or more sets of antenna may be circumferentially spaced from each other at common axial location.

In one aspect, the tool member may be a conductive member, such as a drill collar or a metallic sleeve placed around a drill collar or another tool body or it may be a longitudinal member associated with a wireline tool. Any of the collocated antennas may be an axial antenna, transverse antenna or an antenna with another suitable orientation. An axial antenna may include a plurality of axial slots or grooves made on a tool member and at least one electrical conductor, such as a wire, placed over the plurality of slots to form a loop antenna. A suitable high magnetic permeability material, such as ferrite, may be placed between the tool body and the wire to improve sensitivity of the antenna. In one configuration, a transverse antenna may include one or more transverse slots (such as slots made along a circumferential direction) made in the a longitudinal member and one or more wires placed over or along the slots to form a loop antenna. In one configuration, some of the transverse slots of a transverse antenna may be placed above (i.e., uphole of the axial slots) and some below (i.e., downhole) of the axial slots. The wires for the antennas corresponding to the axial and transverse antennas may be mutually orthogonal.

In another aspect, some of the axial slots may be made shorter than the remaining axial slots. Circumferential slots of a transverse antenna may be placed adjacent the shortened axial slots. Alternatively, slots for a second transverse antenna may be provided between two groups of transverse slots of another transverse antenna. Thus, a downhole tool may include two or more antennas located at the same or substantially the same location of a tool.

In another aspect, the axial antenna may include at least two groups of spaced apart axial slots so that gaps are available along a circumferential direction of the tool between the two groups of axial slots. A wire loop is placed over the two groups of the axial slots to provide a loop antenna. In this configuration, at least two groups of radial slots may be placed in the gaps between the axial slots. A wire placed in the two groups of radial slots provides a loop for the radial antenna. In another aspect, two transverse antennas may be placed at the same or substantially the same location on a tool, wherein each antenna includes at least two groups or sets of spaced apart slots for the first antenna and at least two groups of slots for the second transverse antenna that are placed between the two groups of slots of the first transverse antenna. A separate wire loop is provided for each such transverse antenna. Some or all of the slots of each antenna may include a high magnetic permeability or a low magnetic reluctance element or material, such as a ferrite material, between the wire and the metallic tool body. In one aspect, a gap may exist between the tool body and the wire for the antennas. Also, multiple wires may be used instead of a single wire to form the loop antenna. Each antenna may be operated as a transmitter or receiver of a logging-while-drilling or wireline tool. Therefore any combination of receiver and/or transmitter antennas may be collocated.

In another aspect, the disclosure provides a method that comprises collocating a first antenna having a first orientation and a second antenna having a second orientation at the same of substantially the same location of a resistivity tool. In one aspect, placing the first antenna may include placing at least one slot along a first direction in a longitudinal body associated with the tool and a wire in the at least one slot to form the first antenna. In another aspect, placing the second antenna further may include placing at least one slot in a second direction in the longitudinal body and a wire in the at least one slot to form the second antenna. In one aspect, the slots for the first and second antennas may be mutually orthogonal. In another aspect, the method further may include placing a third antenna having a third orientation at the same or substantially the same location of the first and second antennas. The first, second and third orientations may be mutually orthogonal. In another aspect, a material having a high magnetic permeability or a low magnetic reluctance may be placed in some or all slots of any particular antenna.

Examples of the more important features of the apparatus and method for estimating an electrical property of interest have been summarized rather broadly in order that the detailed description provided herein may be better understood. There are, of course, additional features of the apparatus and method that will be described hereinafter and which will form the subject of the claims appended hereto. An Abstract is provided herein to satisfy certain Patent Office requirements. The Summary and the Abstract are not intended to limit the scope of the claims in this or an application that may take priority from this application.

BRIEF DESCRIPTION OF THE DRAWINGS

The features which are believed to be characteristic of the disclosure, both as to organization and methods of operation, together with the advantages thereof, will be better understood from the following detailed description and the drawings wherein the embodiments are illustrated by way of example for the purpose of illustration and description only and are not intended to limit the scope of the claims or the disclosure, wherein:

FIG. 3 shows a placement of slots for an axial (z) and a transverse (x) antenna on a tool member of a resistivity tool;

FIG. 4A shows a cross-sectional view of the tool of FIG. 3 taken along an axial direction showing the placement of an antenna wire and ferrite material;

FIG. 4B shows a cross-sectional view of FIG. 3 taken along a transverse direction showing the placement of antenna wire and ferrite material;

DETAILED DESCRIPTION

Figure 1:
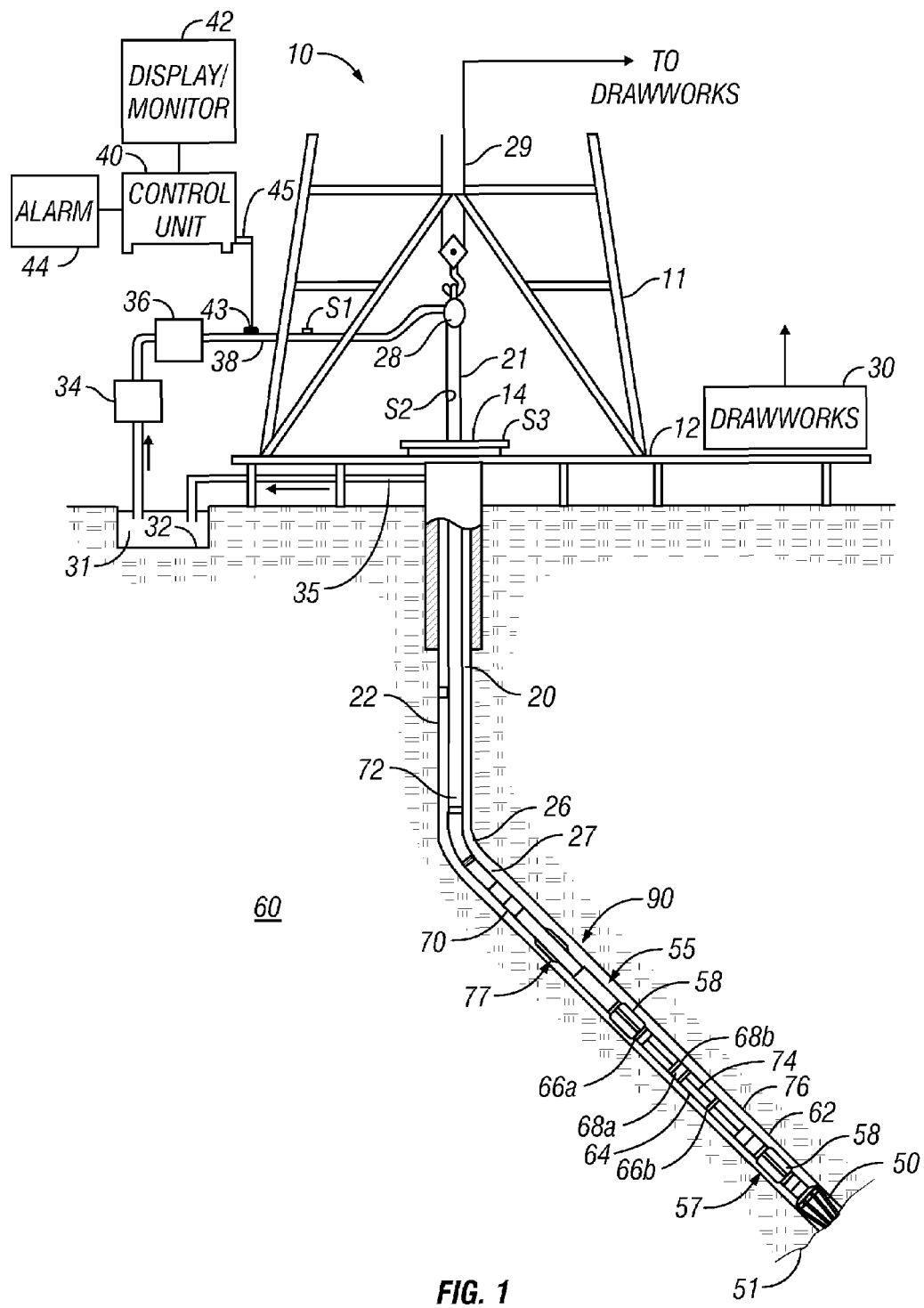
FIG. 1 shows a schematic diagram of a drilling system having a drill string containing a drilling assembly that includes a resistivity tool made according to one embodiment of the present disclosure.

FIG. 1 shows a schematic diagram of a drilling system 10 that includes a drill string 20 having a drilling assembly 90, also referred to as a bottomhole assembly (BHA) for drilling a borehole 26 (also referred to as a wellbore) in an earth formation 60. The drilling system 10 is shown to include a conventional derrick 11 erected on a floor 12 that supports a rotary table 14 that is rotated by a prime mover, such as an electric motor (not shown), at a desired rotational speed. The drill string 20 includes a drilling tubula, 22 such as a drill pipe extending downward from the rotary table 14 into the borehole 26. A drill bit 50 attached to the end of the BHA 90 disintegrates the geological formations when it is rotated to form the borehole 26. The drill string 20 is coupled to a drawworks 30 via a kelly joint 21, swivel 28 and a line 29. During the drilling operations drawworks 30 is operated to control the weight on bit, which is a parameter that affects the rate of penetration of the drill bit. The operation of the drawworks 30 is well known in the art and is thus not described in detail herein.

During drilling operations a suitable drilling fluid 31 (also referred to as the "mud") from a source or mud pit 32 is circulated under pressure through the drill string 20 by a mud pump 34. The drilling fluid 31 passes from the mud pump 34 into the drill string 20 via a desurger 36 and fluid line 38. The drilling fluid 31 is discharged at the borehole bottom 51 through an opening in the drill bit 50. The drilling fluid 31 circulates uphole through the annular space 27 between the drill string 20 and the borehole 26 and returns to the mud pit 32 via a return line 35. A sensor $S_1$ in the line 38 provides information about the fluid flow rate. A surface torque sensor $S_2$ and a sensor $S_3$ associated with the drill string 20 respectively provide information about the torque and the rotational speed of the drill string. Additionally, one or more sensors (not shown) associated with line 29 may be used to provide the hook load of the drill string 20 and information about other desired parameters relating to the drilling of the wellbore 26.

In some applications the drill bit 50 is rotated by only rotating the drill pipe 22. However, in many other applications, a downhole motor 55 (mud motor) disposed in the drilling assembly 90 is used to rotate the drill bit 50 and/or to superimpose or supplement the rotation by the drill string. The rate of penetration (ROP) of the drill bit 50 into the borehole 26 for a given formation and a drilling assembly depends upon the weight on bit and the drill bit rotational speed.

In one aspect of the embodiment of FIG. 1, the mud motor 55 is coupled to the drill bit 50 via a drive shaft (not shown)

disposed in a bearing assembly 57. The mud motor 55 rotates the drill bit 50 when the drilling fluid 31 passes through the mud motor 55 under pressure. The bearing assembly 57 supports the radial and axial forces of the drill bit 50, the downthrust of the motor and the reactive upward loading from the applied weight on bit. Stabilizers 58 coupled to the BHA act as a centralizer for the lowermost portion of the mud motor assembly and for other suitable locations on the BHA.

A surface control unit 40 receives signals from the downhole sensors and devices via a sensor 43 placed in the fluid line 38 and signals from sensors $S_1$, $S_2$, $S_3$, hook load sensor and any other sensor used in the system 10 and processes such signals according to programmed instructions provided to the surface control unit 40. The surface control unit 40 displays desired drilling parameters and other information on a display/monitor 42 that may be utilized to control the drilling operations. The surface control unit 40 contains a computer, memory for storing data and computer programs, recorder for recording data and other peripherals. The surface control unit 40 also may include simulation model and processes data according to programmed instructions and responds to user commands entered through a suitable device, such as a keyboard. The surface control unit 40 is adapted to activate alarms 44 when certain unsafe or undesirable operating conditions occur.

Referring back to FIG. 1, BHA 90 also contains sensors and devices for providing a variety of measurements relating to the formation 60 surrounding the borehole and for drilling the wellbore 26 along a desired path. Such devices often include a device for measuring the formation resistivity of the formation and fluid, a gamma ray device for measuring the formation gamma ray intensity and devices for determining the inclination and azimuth of the drill string. A formation resistivity measuring device 64 may be coupled as t a suitable location, such as above a steering device 57 or above a lower kick-off subassembly 62, to provide signals from which resistivity of the formation may be estimated. Inclinometer 74 and gamma ray device 76 are suitably placed along the BHA 90 for respectively determining the inclination of the BHA 90 and the formation gamma ray intensity. In addition, an azimuth device (not shown), such as a magnetometer or a gyroscopic device, may be utilized to determine the drill string azimuth. Such devices are known in the art and therefore are not described in detail herein. In an alternate embodiment, the mud motor 55 may be coupled below the resistivity measuring device 64 or at any other suitable place.

Still referring to FIG. 1, other logging-while-drilling (LWD) tools, also referred to as measurement-while-drilling (MWD) tools or devices, such as tools for measuring formation porosity, permeability and density, may be placed above the mud motor 55 in the housing 78 for providing information useful for evaluating the subsurface formations along the borehole 26. The above-noted devices transmit data to a downhole telemetry system 72, which in turn transmits the received data uphole to the surface control unit 40. The downhole telemetry system 72 also receives signals and data from the surface control unit 40 and transmits such received signals and data to the appropriate downhole devices. The present disclosure may utilize any suitable telemetry technique to communicate data between the downhole sensors and devices during drilling operations, including, but not limited to, a mud pulse telemetry system, an acoustic telemetry system, an electromagnetic telemetry system, a wired pipe, including jointed pipe sections, each section having a communication link, such as an electrical conductor or an optical fiber. For mud pulse telemetry, a transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40.

The drilling system described thus far relates to drilling systems that utilize a drill pipe to convey the drilling assembly 90 into the borehole 26, wherein the weight on bit is controlled from the surface, typically by controlling the operation of the drawworks. However, a large number of current drilling systems, especially those for drilling highly deviated and horizontal wellbores, utilize coiled-tubing for conveying the drilling assembly downhole. In such an application a thruster is sometimes deployed in the drill string to provide the desired force on the drill bit. When coiled-tubing is utilized, the tubing is not rotated by a rotary table but is instead injected into the wellbore by a suitable injector while the downhole motor, such as mud motor 55, rotates the drill bit 50. For offshore drilling, an offshore rig or a vessel is used to support the drilling equipment, including the drill string. In wireline applications various formation evaluation tools, including a resistivity tool, are lowered into a wellbore and measurements from all such tools are logged and processed.

According to one aspect of the present disclosure, the resistivity tool 64 may include a plurality of antennas, which may be configured as transmitters and/or receivers. In one configuration, the resistivity tool may include at least two antennas 68*a* and 68*b* placed at the same or substantially the same axial location of the tool 64. Such antennas also are referred to as being collocated. Collocating antennas, such as antennas 68*a* and 68*b*, can reduce the length of the resistivity tool and thus the BHA 90 and it also does not require depth interpolation as in the case of non-collocated antennas. Additionally, other antennas, such as antennas for transmitter 66*a* and 66*b* may be placed spaced apart from the collocated antennas 68*a* and 68*b*. However, any combination of transmitter and/or receiver antennas may be collocated. Thus, the resistivity tool 64 may include any number of transmitter and receiver antennas, wherein at least two such antennas are collocated.

Figure 2:
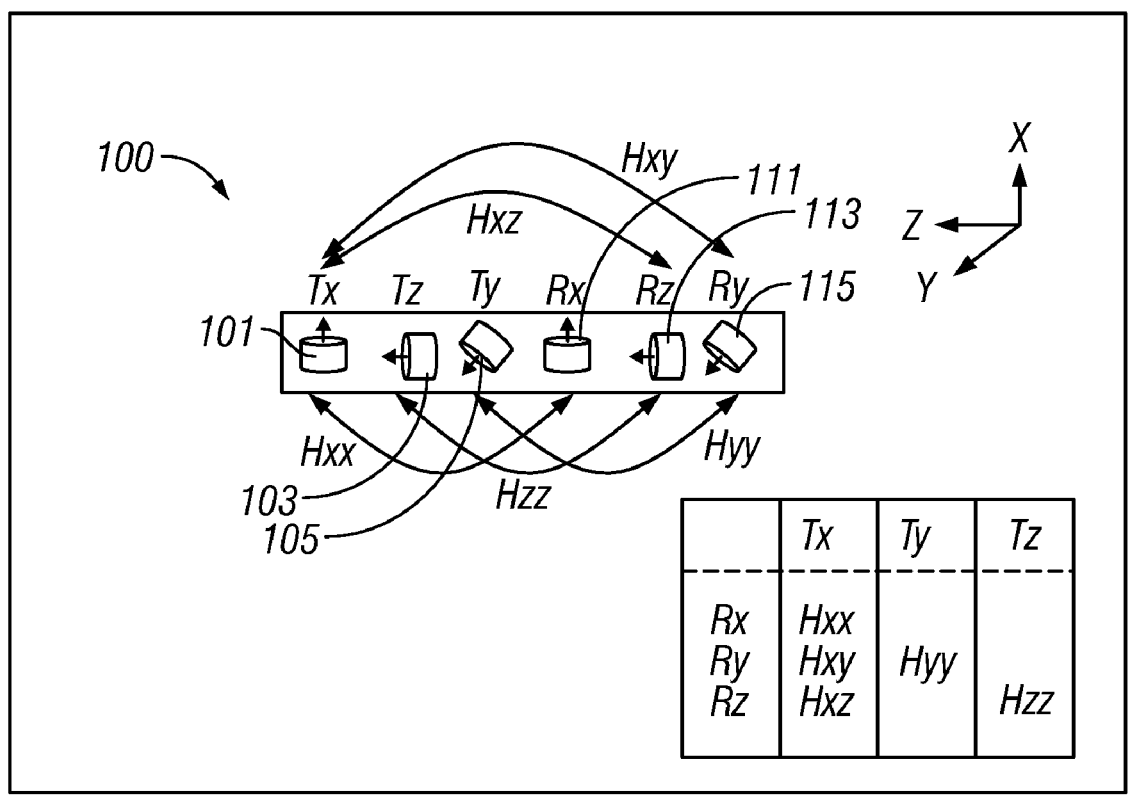
FIG. 2 shows an exemplary configuration of antennas of a multi-component resistivity tool.

FIG. 2 shows an exemplary configuration of transmitter and receiver coils of a multi-component resistivity tool for explaining the general nature of the axial and transverse resistivity tool. Any two or more such or other antennas may be collocated on a resistivity tool made according to the present disclosure, as described in more detail in reference to FIGS. 6-12. As an example, FIG. 2 shows an exemplary configuration of transmitters and receivers of a multi-component resistivity tool 100 that include azimuthally sensitive x and y transverse antennas. The tool 100 is shown to include three orthogonal transmitters 101, 103, and 105, referred to as the $T_x$, $T_z$, and $T_y$ transmitters, which are placed spaced apart on the tool. The subscripts (x, y, z) indicate an orthogonal system that is defined by the directions of the normals to the transmitters. The z-axis is chosen to be along the longitudinal axis of the tool, while the x-axis and y-axis are mutually perpendicular and lying in the planes transverse to the tool axis. The three transmitters 101, 103 and 105, referred to as $T_x$, $T_y$ and $T_z$ transmitters respectively, induce magnetic fields in three spatial directions. Corresponding to each transmitter 101, 103, and 105 are associated receivers 111, 113, and 115, referred to as the $R_x$, $R_z$ and $R_y$ receivers respectively, aligned along the orthogonal system defined by the transmitter normals x, y and z and placed in the order shown in FIG. 1. Receivers $R_x$, $R_z$, and $R_y$ measure the corresponding magnetic fields $H_{xx}$, $H_{zz}$, and $H_{yy}$ generated by the transmitters $T_z$, $T_z$ and $T_y$ respectively. Within this system of magnetic fields, the first index or subscript indicates the direction of the transmitter and the second index indicates the direction of the receiver. In addition, the receivers $R_y$ and $R_z$, measure two cross-components, $H_{xy}$ and $H_{xz}$, of the magnetic fields produced by the $T_x$ transmitter (101).

The orientation of the transmitters and receivers remains fixed with respect to the tool axis. The multi-component tool in horizontal configuration is sensitive to the anisotropic formation, tool location as well as the rotation of the tool around its axis. In the configuration of FIG. 2, the x and y antennas are azimuthally sensitive. Typically, only the $H_{zz}$ component is insensitive to the tool rotation. In the horizontal configuration, the average $(H_{xx}+H_{yy})/2$ is independent of tool rotation. The $H_{zz}$ and $(H_{xx}+H_{yy})/2$ measurements are dependent on the formation and the tool location and thus can be used to determine the distance from the bed boundaries and for geo-steering of the BHA. Also, each transmitters may be operated at any frequency within a range of frequencies, such as between 50 kHz-2 MHz. The configuration shown in FIG. 2 provides just one possible placement of transmitters and receivers. The transmitters and receivers, however, may be placed in any suitable manner. The above-noted configuration allows determination of the direction in which the drill bit is approaching a geologic target. For many applications, it is acceptable to place some of the antennas of a multi-component resistivity tool at the same or substantially the same position of the resistivity tool. For example, any of the two or all three of the $R_x$, $R_y$ and $R_z$ antennas may be collocated on the tool 64. Similarly transmitters $T_x$, $T_y$ and $T_z$ maybe collocated. For the purpose of the present disclosure, any suitable combination of collocated and uncollocated antennas may be used as described in reference to the various configurations shown in FIGS. 6-12.

In one aspect, a groove design in a tool member is provided for building an x-coil (used as a transmitter or receiver). This design enables the x-coil to radiate or detect transverse magnetic fields and protect the coil electrical conductors (wires) from damages posed by the drilling operations. In one aspect, a transverse coil may be built by spreading an electrical conductor (wire) outside the collar surface on the opposite sides of the collar. The wire may then be connected at the ends from inside the collar. A gap between the wire and the collar surface may be provided to enhance the antenna reception. The wires may further be protected by any suitable mechanically strong and electrically non-conducting material.

Figure 5:
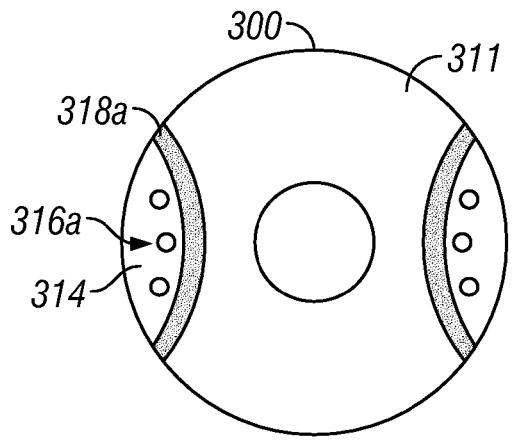
FIG. 5 shows an alternative arrangement of antenna wires and associated ferrite material for the axial antenna shown in FIG. 3.

FIGS. 3, 4A and 4B illustrate an example of the construction of axial (z) and transverse (x) antennas. FIG. 3 shows a tubular 300 with a plurality of axial slots or grooves 312 (parallel to the axis of the tool) made around the periphery (circumferentially) of the tubular 300 for housing an axial (z) antenna. Transverse slots 314 or grooves (normal to the axis the tubular 300) are formed for the transverse (x) antenna. The slots 312 may be made substantially around the entire periphery of the tool body 300 or in spaced apart groups as described later with respect to FIGS. 6-12. In the configuration shown in FIG. 3, slots 314 are formed as two groups or sets on the opposite side of the tubular 300. FIG. 4A shows a radial cross-section view taken along the grooves 314. A ferrite material 402 is placed in each of the slots 314 and an insulating wire 316 is placed in the holes 406 made in the metallic spaces between the slots 314. A small gap 310 (similar to the gap shown in FIG. 4B) exists between the slot bottom and the wire 316. FIG. 4B shows an axial cross-sectional view of a portion of the tubular 300 containing the transverse slots 314 for the purpose of showing the routing of the wire 316 along the two sets of slots 314 on the opposite sides of the tubular 300. The wire 316 is placed through holes made in each of the metal portions between the slots 314 over the ferrite elements so a gap is created between the bottom 315 of the metallic housing and the wire 316. The wire 316 is looped over the two sets of slots 314 to form a loop antenna. The two ends of the wire 316 are connected to a transmitter circuit or a receiver circuit, which is generally denoted herein by "v." In the MWD tool configuration, the tool body 300 includes a through bore 321 that allows placement of other component or the BHA 90 and allows for the passage of the drilling fluid therethrough. Another design may use multiple wires 316a backed by a straight or curved ferrite material 318a placed in the slots (FIG. 5). Metal drill collars are suitable because of their high conductivity and mechanical strength. The design shown herein produces surface currents that mute the field inside the collar 300. As a result, the physical wire loop produces/ receives no or very few magnetic fields except in the groove areas 314. The effect of the physical wire loop may thus be replaced with small loops. The areas of the small loops are given by the gaps between the wire 316 and the groove bottom 315. The moments of the small loops point in the same direction and thus responses add to each other. For the loop to radiate or receive fields, the grooves have open ends in the direction parallel to the field path.

The structures and methods of the present disclosure may be used with data acquired with a logging instrument conveyed on a wireline and also with data acquired using an MWD tool conveyed on a drilling tubular, such as a drill string or coiled tubing. When used for MWD measurements, this directional information may be used for controlling the direction of the drilling assembly and maintaining the position of the borehole relative to beds in the proximity of the borehole.

For illustration purposes, the antennas of a multi-component resistivity tool described above are shown spaced apart. In many cases, it is desirable to reduce the length of the BHA or the wireline tool. The present disclosure provides various exemplary configurations for placing two or more antennas at the same or substantially the same location of the drill collar or the housing of the wireline tool. Thus, for example, an x-receiver and a z-receiver may be collocated at a selected axial location of the tool. Similarly, any combination of x, y and z antennas may be collocated. Multiple antennas located at the same or substantially the same position (also referred to herein as collocated) can reduce the length of the tool. Also, for accurate measurements, depth interpolations are made for each of the antenna locations. Data measured from multiple antennas collocated at the same axial position can facilitate processing and interpretation because no or fewer depth interpolations are needed for processing the measurements to determine the properties of interest.

Figure 6:
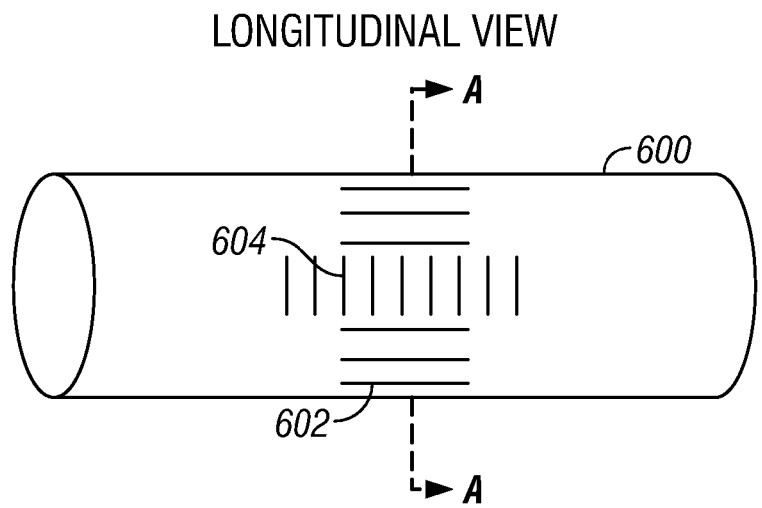
FIG. 6 shows a configuration for the placement of transverse and axial antennas along a resistivity tool.
Figure 6A:
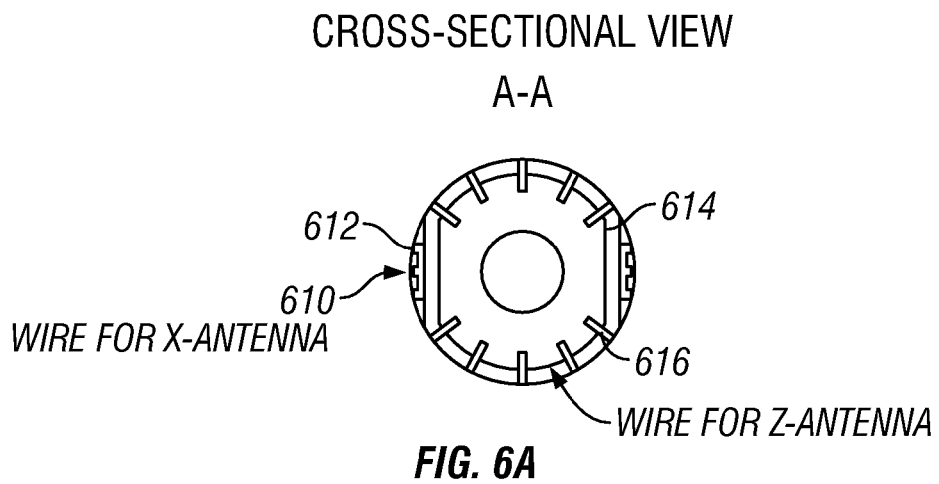
FIG. 6A shows a cross-section of the tool of FIG. 6 showing the placement of an antenna wire and ferrite material.

FIG. 6 shows a longitudinal view of a tool 600 wherein a transverse (x) antenna and an axial (z) antenna are collocated according to one embodiment of the present disclosure. In this configuration, some of the axial slots 602 for the axial (z) antenna are placed with the transverse slots 604 for the transverse (x) antenna at the same axial or longitudinal position of the tool. In the configuration shown in FIG. 6, two groups of transverse slots 604, each having one or more axial slots of a desired length and depth, are formed on the opposite sides of the tool 600. Similarly two groups of axial slots 602 are placed in the radial spaces between the two groups of axial slots 604. Some or all slots may contain a high magnetic permeability material, such as a ferrite material. The wires are routed to form loop antennas for each of the x and z antennas. FIG. 6A shows a cross-sectional view of the tool 600 taken along the arrows A-A. As seen, the wire 612 for the transverse (x) antenna is placed in the holes made in the spaces between the slots and looped around the two sets of slots 604 on the opposite sides to form the loop antenna. A ferrite material 612 is placed between the bottom of each slot 604 and the wire 610 to direct the transmitted signals outward from the tool body when the antenna is used as a transmitter and to aid in the reception of the signals from the earth formation when the antenna is used as a receiver. The wire 614 for the z-antenna is placed around the tool in the holes 616 made in spaces between the slots 602 to form a loop.

Figure 7:
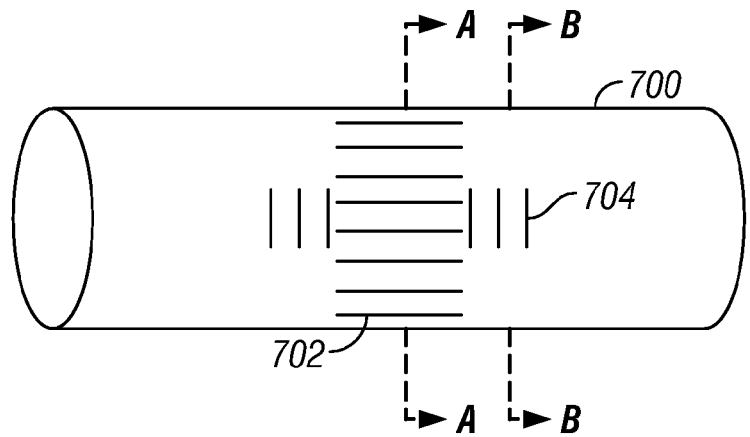
FIG. 7 shows another configuration for the placement of an axial antenna and a transverse antenna along a resistivity tool.
Figure 7A:
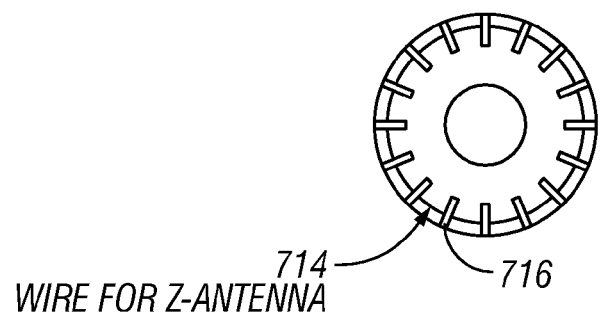
FIG. 7A and FIG. 7B show cross-sections of the tool of FIG. 7 showing the placement of wires and ferrite material for the axial antenna and transverse antennas, respectively.
Figure 7B:
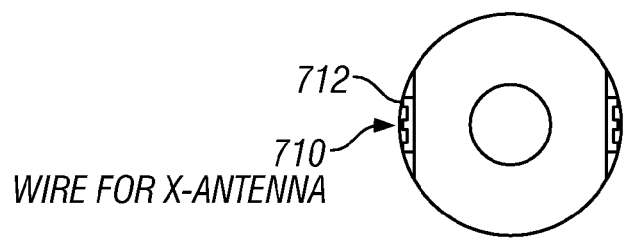

FIG. 7 shows an alternative configuration for placing an axial (z) antenna and a transverse (x) antenna substantially at the same position of a resistivity tool. In the configuration of FIG. 7, the slots 702 for the axial antenna are placed along the entire periphery of the tool 700, substantially in the same manner as the slots 310 of FIG. 3. The transverse slots 704 for the transverse (x) antenna are placed above (uphole) and below (downhole) of the axial slots 702. Symmetry of the antennas may be maintained by the symmetrical position of the slots and the corresponding coils. The transverse antenna coil, in this configuration, is stretched in the tool axis direction compared to the configuration shown in FIG. 6. FIG. 7A shows a cross-section of the tool 700 taken along axial slots as shown by arrows A-A. FIG. 7B shows a cross-sectional view of the tool 700 taken along the arrows B-B. The antenna wire 714 for the axial (z) antenna loops around the tool over in the holes 716 over the ferrite material in each of the slots in the same manner as shown in FIG. 6A. The wire 710 for the transverse (x) antenna is placed through the holes in the spaces between the slots over the ferrite material 712 in each slot and then looped to the second set of slots to form the loop antenna.

Figure 8:
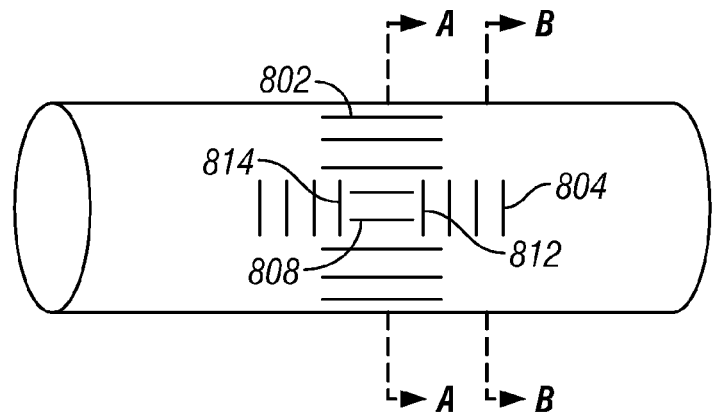
FIG. 8 shows yet another configuration for the placement of an axial antenna and a transverse antenna along a resistivity tool.

FIG. 8 shows yet another configuration for placing an axial (z) antenna and a transverse (x) antenna substantially at the same location of a resistivity tool. In the configuration of FIG. 8, some of the axial slots 808 of the overall axial slots 802 are shortened to accommodate some of the transverse slots 812 and 814 of the overall transverse slots 804 of the transverse antenna. The remaining slots 804 remain above (uphole) and below (downhole) the axial slots. In this configuration, the axial antenna loop and the transverse antenna loops may be formed in the same manner as shown in FIG. 7. Symmetry of the axial and transverse antennas may be maintained by the symmetrical position of the slots and the corresponding coils. The transverse antenna coil in this configuration also is stretched in the tool axis direction compared to the configuration shown in FIG. 6. The cross-sections shown in FIGS. A and 7B with respect to the positions of the wires and the ferrite materials equally apply to the antennas of FIG. 8.

Figure 9:
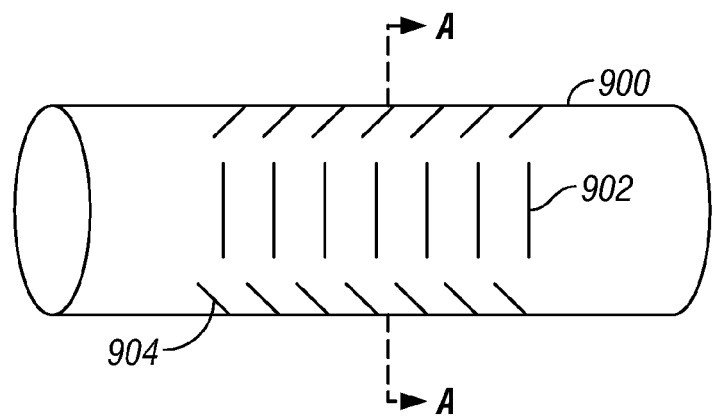
FIG. 9 shows a configuration for the placement of two (x and y) transverse antennas along a resistivity tool.
Figure 9A:
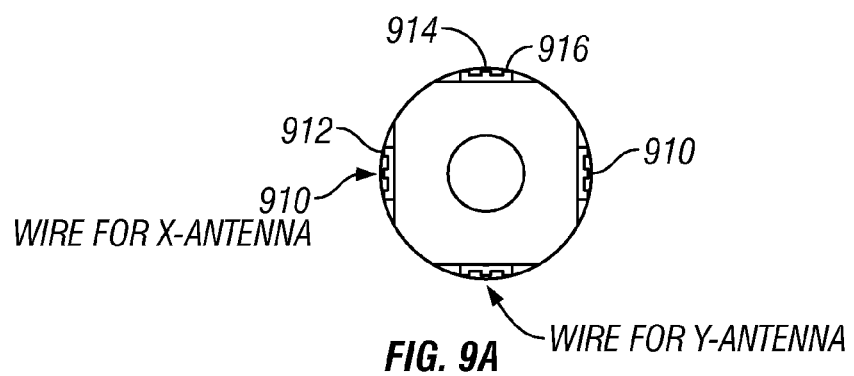
FIG. 9A shows a cross-sectional view of the tool of FIG. 9 showing the placement of wires and ferrite material for each of the x and y transverse antennas.

FIG. 9 shows a configuration for collocating two transverse (x and y) antennas on a resistivity tool 900. In this configuration, a pair of groups of transverse slots 902 are made on the opposite sides of the tool 900 for forming a first transverse antenna, for example the x-antenna. A second pair of groups of slots 904 is formed on the opposite sides of the tool 900 between the groups of the slots of the first antenna to form a second transverse antenna, for example a y-antenna. Each of the x and y antennas may be formed in the same manner as shown in FIG. 6. FIG. 9A shows a cross-sectional view of the tool 900 taken along the arrows A-A. As shown, a wire 910 placed over the ferrite materials 912 in the slots 902 forms the x-antenna, while the wire 914 placed over the ferrite materials 916 in the slots 904 forms the y-antenna. Symmetry of the antennas is maintained in the same manner as described in reference to FIG. 6.

Figure 10:
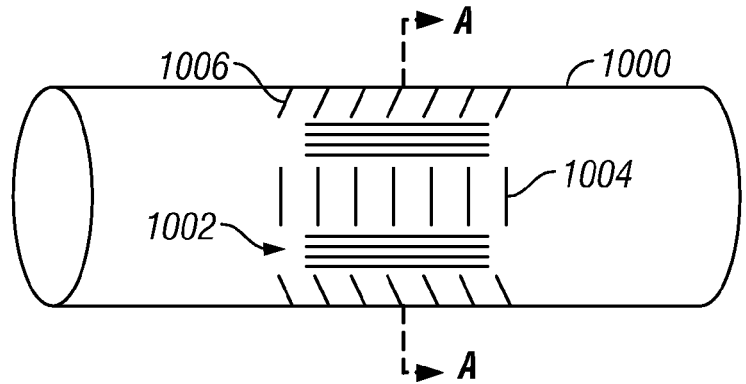
FIG. 10 shows a configuration for the placement of an axial (z) antenna and two transverse (x and y) antennas along a resistivity tool.
Figure 10A:
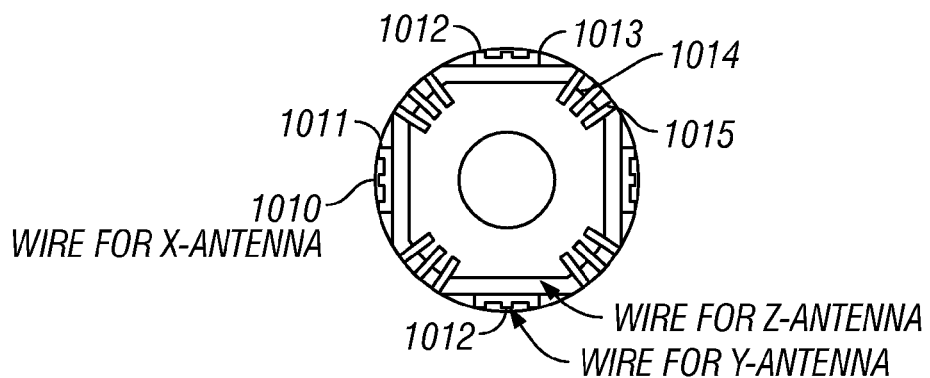
FIG. 10A shows a cross-sectional view of the tool of FIG. 10, showing the placement of wires and ferrite material for each of the x, y and z antennas.
Figure 11:
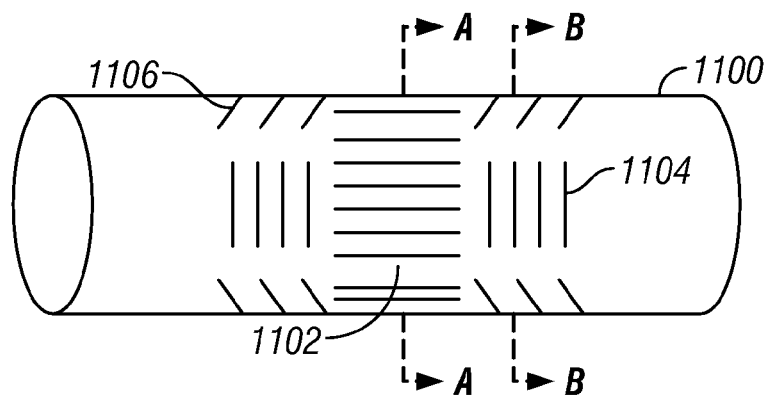
FIG. 11 shows an alternative configuration for the placement of x, y and z antennas along a resistivity tool.
Figure 12:
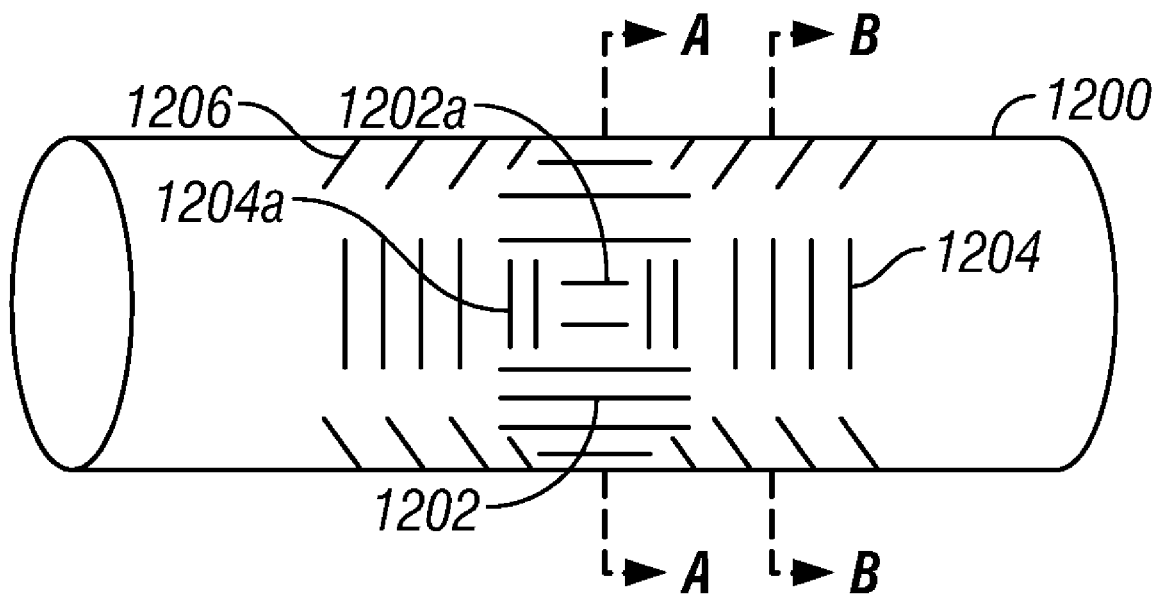
FIG. 12 shows yet another configuration for placing transverse (x and y) antennas and an axial (z) antenna along a resistivity tool.

FIGS. 10-12 show different configurations for collocating an axial (z) antenna and a pair of transverse antennas (x and y) on a resistivity tool. In the configuration of FIG. 10, the x-antenna slots 1004 and y-antenna slots 1006 are formed on the tool 1000 in the same manner as shown in FIG. 9. The axial slots 1002 for the axial (z) antenna are formed in the spaces between the x and y antenna slots. In this manner four groups of slots are formed. One group containing four sets of slots 1002 that are placed apart around the tool 1000 for the x-antenna; a second group containing two sets of slots 1004 on the opposite side of tool 1000, but between the axial slots 1002, to form the x-antenna; and a third group containing two sets of slots 1006, to form the y-antenna. The symmetry of the antenna coils is maintained in the manner described earlier. FIG. 10A shows a cross-section of the tool 1000 taken along the arrows A-A. The wire and ferrite placement for the x and y antennas is the same as shown in FIG. 9. The x-antenna wire 1010 is shown placed on the ferrite members 1011 on the opposite sides of the tool body and the y-antenna wire 1012 placed on the ferrite material 1013 is shown between the x-antennas on the opposite sides of the tool 1000. The z-axis antenna wire 1014 is placed around and over the ferrite material 1015. In this configuration all of the coils for the three antennas are placed on the same axial position of the tool 1000.

FIG. 11 shows another configuration for placing the x, y, and z antennas at substantially the same axial position of a resistivity tool 1100. In the configuration of FIG. 11, the slots 1102 for the z-antenna and the slots 1104 for the x-antenna are made in the same manner as shown in FIG. 7. The z-antenna slots 1102 are formed around the tool 1100. The x-antenna slots 1104 are placed above and below the slots 1102 in the same manner as shown in FIG. 8. The y-antenna slots 1106 also are placed above and below the axial slots but between the slots for the x-antenna, similar in manner shown in FIG. 9. The antenna wires also are placed in manner similar to shown in FIG. 9.

FIG. 12 shows yet another configuration for placing the x, y and z-antennas at the same or substantially the same axial location of a resistivity tool 1200. In this configuration, the z-antenna slots 1202 and the x-antenna slots 1204 are formed in substantially the same manner as shown in FIG. 8, in that some of the z-antenna slots 1202a are shortened to accommodate some of the x-antenna slots 1204a. The y-antenna slots 1206 are formed in a manner similar to FIG. 11. It will be seen that each of the configurations of FIGS. 10-12 allows for maintaining the symmetry of the antennas.

As noted above, an antenna made according to this disclosure may contain a high permeability magnetic material between the metallic member and the electrical conductor to enhance the transmission or reception of the antenna. Any suitable material may be use as the high magnetic permeability material, including, but not limited to: (i) a soft ferrite material; (ii) an electrically conductive soft amorphous magnetic alloy; (iii) an electrically conductive nanocrystaline soft magnetic alloy; (iv) a stack made of soft amorphous magnetic alloy; (v) a stack made of a nanocrystaline soft magnetic alloy; (vi) a soft iron powder containing at least one of an organic and an inorganic binder; (vii) a sendust containing at least one of an organic and an inorganic binder; and (viii) a nickel iron alloy powder containing at least one of an organic and an inorganic binder. Although the slots shown in the described configurations are generally orthogonal to each other, the antennas may also be placed in any other desired direction, such as by placing the slots and/or wires along non-orthogonal directions.

Some resistivity tools may not use a conductive housing or a tool body, such as a drill collar. In such cases, the slots may not be necessary or desired. In such cases, slots and/or the ferrite material may be omitted from the described configurations. A plurality of antennas, however, may be placed at the same or substantially the same axial position of a resistivity tool to gain the advantages of the disclosure. Additionally, some applications use tilted antennas instead of the axial and transverse antennas described herein. The collocated antennas made according to this disclosure may be used as tilted antennas. A tilted antenna typically detects two field components. Thus a combination, such as a combination of an axial antenna and a transverse antenna made according to the disclosure also may be used to provide the detection of two field components. Thus, suitable combination of the axial antennas and a transverse antenna may be used to function as a tilted antenna. Also, each antenna may be configured as a transmitter or receiver. Therefore each antenna may be coupled to a transmitter or a receiver circuit as the case may be. The transmitter circuit may include an oscillator that enables an associated antenna to transmit electromagnetic signals at a plurality of frequencies within a range of frequencies, such as between 50 KHz-2 MHz. The transmitter circuit also may include a controller (including a processor, such as a microprocessor) and associated circuits, such as memory for storing program and data, and signal processing circuitry. The receiver circuits may include circuits to receive signals detected by the coils, amplify such received signals, A/D converters to convert the analog signals to digital circuits, a controller, including a processor, and other, including memory for storing program and data. The signals from each receiver may be processed, at least in part, downhole and transmitted to the surface and/or stored in memory in the tool. A processor processes the signals to provide estimates of one or more parameters of interest, such as electrical properties of the formation and downhole fluids. The estimated parameter values are recorded in any suitable storage medium.

Thus, the disclosure in one aspect provides an apparatus for use in a wellbore that may include: a longitudinal tool member; a first antenna having a first orientation and a second antenna having a second orientation, wherein the first antenna and second antenna are placed at substantially a common location of the tool member. In one aspect, the first orientation and second orientation may correspond to any suitable directions, including but not limited to: (i) a longitudinal tool axis and a transverse tool axis; (ii) a first transverse axis of the tool and a second transverse axis of the tool; and (iii) a first direction and a second direction non-orthogonal to the first direction. The apparatus may further include a third antenna that has a third orientation, wherein the third orientation is along any suitable direction, including but not limited to: (i) at an angle relative to each of the first orientation and second orientation; and (ii) substantially orthogonal to the first orientation and the second orientation. Each antenna may further include: at least one slot made in the tool member; a high magnetic permeability material placed in the at least one slot; and an electrical conductor over the slot to form a loop antenna. In another aspect, the first antenna may include a first set of slots and the second set of slots, wherein the first set of slots and the second set of slots occupy the common location in any suitable configuration, including but not limited to: (i) the first set of slots split into at least two subsets, each subset placed along a radial axis of the tool member with a space between the at least two subsets and the second set of slots placed in the space between the at least two subsets of slots; and (ii) the first set of slots placed along a radial direction of the tool member and the second set of slots split into at least two subsets, with at least one such subset of slots placed on either side of the first set of slots. The apparatus may further include a third antenna, wherein the first antenna includes a first set of slots, the second antenna includes a second set of slots and the third antenna includes a third set of slots, wherein the first set of slots is placed along a first direction, the second set of slots is placed along a side of the first set of slots along a second direction, and the third set of slots is placed along a side of the first or second set of slots along a third direction. In one aspect, the first, second and third set of slots may be substantially orthogonal to each other and wherein at least some of the slots in each of the first, second and third set of slots include a high magnetic permeability material and a separate electrical conductor to form a separate loop antenna associated with the first, second and third set.

The high magnetic permeability material may be any suitable material, including but not limited to: (i) a soft ferrite material; (ii) an electrically conductive soft amorphous magnetic alloy; (iii) an electrically conductive nanocrystaline soft magnetic alloy; (iv) a stack made of soft amorphous magnetic alloy; (v) a stack made of a nanocrystaline soft magnetic alloy; (vi) a soft iron powder containing at least one of an organic and an inorganic binder; (vii) a sendust containing at least one of an organic and an inorganic binder; and (viii) a nickel iron alloy powder containing at least one of an organic and an inorganic binder. The tool member that carries the antenna may be any suitable member, including but not limited to: (i) a drill collar of a drilling assembly; (ii) a metallic sleeve mounted on a portion of a drill collar of a drilling assembly; and (iii) a housing of a wireline resistivity tool. The apparatus further may include one or more processors, which process the signals received by one or more receivers of the apparatus to estimates one or more properties or parameters of interest. The property of interest may be: (i) an electrical property of the formation; (ii) an electrical property of a fluid downhole; (iii) anisotropic at a selected dipping angle; and (iv) a direction of an approaching bed relative an element of the apparatus. The apparatus may include a set of antennas at one location and a second set of antennas at the same axial location, but displaced along the circumference of the tool.

In another aspect, a method is provided that may include: transmitting electromagnetic radiation signals into an earth formation; and receiving electromagnetic radiation signals from the formation responsive to the transmitted electromagnetic radiation signals; wherein one of transmitting and receiving the electromagnetic signals is carried by one of a first and second antennas collocated on the downhole tool. The received signals may be processed the received electromagnetic radiation signals to estimate the property of interest; and recording the property of interest in a suitable medium. The terms "same location" and "collocated" mean substantially the same axial and circumferential or radial location of a longitudinal member.

While the foregoing disclosure is directed to the described embodiments of the disclosure, various modifications will be apparent to those skilled in the art. It is intended that all such variations are considered as part of the inventive concepts described herein. Summary is provided herein to merely familiarize the reader with the subject matter of the disclosure and is not intended to limit the scope of the claims or the disclosure of the application or any application that may take a priority from this application. Abstract is provided per requirements of the Patent offices and is not to be used to limit the scope of the claims or the disclosure herein.

The invention claimed is:

1. An apparatus for use in a wellbore, comprising:
   a longitudinal tool member;
   a first set of slots at a selected location in the longitudinal tool member and a first conductor associated with the first set of slots to form a first antenna having a first orientation; and
   a second set of slots substantially at the selected location of the longitudinal tool member and a second conductor associated with the second set of slots to form a second antenna having a second orientation, thereby forming the first antenna and the second antenna at substantially a common location of the tool member, wherein the common location is common relative to a longitudinal axis and a radial axis of the tool member.

2. The apparatus of claim 1, wherein the first orientation and the second orientation correspond respectively to one of: (i) a longitudinal axis and a transverse axis of the tool member; (ii) a first transverse axis of the tool member and a second transverse axis of the tool member; and (iii) a first direction and a second direction non-orthogonal to the first direction.

3. The apparatus of claim 1 further comprising a third set of slots and a third electrical conductor placed over the third set of slots to form a third antenna having a third orientation, wherein the third orientation is one of: (i) at an angle relative to each of the first orientation and the second orientation; and (ii) substantially orthogonal to the first orientation and the second orientation.

4. The apparatus of claim 1, wherein at least one of the first antenna and the second antenna includes:
   a high magnetic permeability material placed in one of the first set of slots and second set of slots; and
   the electrical conductor over the one of the first and second sets of slots to form a loop antenna.

5. The apparatus of claim 1, wherein the first set of slots and the second set of slots occupy the common location in a manner that is one of: (i) the first set of slots split into at least two subsets of slots, each of the at least two subsets placed along a radial axis of the tool member with a space between the at least two subsets of slots and the second set of slots placed in the space between the at least two subsets of slots; and (ii) the first set of slots placed along a radial direction of the tool member and the second set of slots split into at least two subsets of slots, with at least one of the two subsets of slots placed on either side of the first set of slots.

6. The apparatus of claim 1 further comprising a third antenna, wherein the third antenna includes a third set of slots, and wherein the first set of slots is placed along a first direction, the second set of slots is placed along a side of the first set of slots along a second direction, and the third set of slots is placed along a side of one of the first set of slots and second set of slots along a third direction.

7. The apparatus of claim 6, wherein the first, second and third set of slots are substantially orthogonal to each other and wherein at least some of the slots in each of the first, second and third sets of slots include a high magnetic permeability material and a separate electrical conductor to form a separate loop antenna associated with the first, second and third set of slots.

8. The apparatus of claim 1, wherein the tool member is one of: (i) a drill collar of a drilling assembly; and (ii) a metallic sleeve mounted on a portion of a drill collar of a drilling assembly.

9. The apparatus of claim 1, wherein each of the first antenna and the second antenna is part of one of: (i) a transmitter configured to transmit electromagnetic radiation signals into an earth formation surrounding a wellbore, and (ii) a receiver configured to receive electromagnetic radiation signals from an earth formation.

10. The apparatus of claim 9 further comprising a processor configured to process the electromagnetic radiation signals received by at least one of the first antenna and the second antenna from the earth formation and to estimate a property of interest.

11. The apparatus of claim 10, wherein the property of interest is selected from a group consisting of: (i) an electrical property of the formation; (ii) an electrical property of a fluid downhole; (iii) anisotropy at a selected dipping angle; and (iv) a direction of an approaching bed relative to an element of the apparatus.

12. The apparatus of claim 4, wherein the high magnetic permeability material is selected from a group consisting of: (i) a soft ferrite material; (ii) an electrically conductive soft amorphous magnetic alloy; (iii) an electrically conductive nanocrystalline soft magnetic alloy; (iv) a stack made of soft amorphous magnetic alloy; (v) a stack made of a nanocrystalline soft magnetic alloy; (vi) a soft iron powder containing at least one of an organic and an inorganic binder; (vii) a sendust containing at least one of an organic and an inorganic binder; and (viii) a nickel iron alloy powder containing at least one of an organic and an inorganic binder.

13. The apparatus of claim 1 further comprising a third antenna having the first orientation and a fourth antenna having the second orientation, wherein the third and fourth antennas are placed at a substantially common location of the tool member that is radially spaced apart from the location of the first and second antennas.

14. The apparatus of claim 13, wherein the third antenna is spaced substantially 180 degrees from the first antenna and the fourth antenna is spaced substantially 180 degrees from the second antenna.

15. An apparatus for estimating a property of interest downhole, comprising:
   a downhole assembly configured to carry a resistivity tool, wherein the resistivity tool includes:
   at least two antennas co-located on a drill collar, wherein each of the at least two antennas is formed by placing an electrical conductor on a respective set of slots formed on a surface of the drill collar, wherein the respective set of slots are at a common location relative to a longitudinal axis and a radial axis of the drill color and wherein each of the at least two antennas is configured to operate as one of a transmitter and a receiver; and
   a circuit associated with each of the at least two antennas configured to operate its associated antenna as one of the transmitter and the receiver.

16. The apparatus of claim 15 further comprising a processor configured to process signals received by one of the at least two antennas from a formation to estimate a property of interest.

17. The apparatus of claim 16, wherein the at least two antennas comprise three mutually orthogonal co-located antennas.

18. The apparatus of claim 15, wherein at least one of the at least two antennas is azimuthally sensitive relative to a wellbore longitudinal axis.

19. The apparatus of claim 15, wherein the downhole assembly includes:
   a drill bit configured to drill a wellbore;

a steering device configured to steer the downhole assembly along a selected drilling direction; and a controller configured to control the drilling direction in response to the property of interest.

20. A method of estimating a property of interest using a downhole tool, comprising:

transmitting electromagnetic radiation signals into an earth formation; and receiving electromagnetic radiation signals from the formation responsive to the transmitted electromagnetic radiation signals at a plurality of azimuthally sensitive receivers, wherein at least two such receivers are co-located and formed by placing an electrical conductor on a respective set of slots formed on a tool member and wherein the respective set of slots are at common location relative to a longitudinal axis and a radial axis of the tool member.

21. The method of claim 20 further comprising:

processing the received electromagnetic radiation signals to estimate the property of interest; and recording the property of interest in a suitable medium.

* * * * *